(12) United States Patent
Miller et al.

(10) Patent No.: US 8,981,921 B2
(45) Date of Patent: Mar. 17, 2015

(54) STATUS INDICATOR AND REMINDER SYSTEM FOR VEHICLE TEMPORARY MOBILITY KIT

(75) Inventors: Thomas Lee Miller, Ann Arbor, MI (US); Scott Alan Watkins, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 391 days.

(21) Appl. No.: 13/343,290

(22) Filed: Jan. 4, 2012

(65) Prior Publication Data

US 2012/0105222 A1 May 3, 2012

Related U.S. Application Data

(63) Continuation-in-part of application No. 11/852,275, filed on Sep. 8, 2007, now Pat. No. 8,115,615.

(51) Int. Cl.
| | | |
|---|---|---|
| *B60Q 1/00* | (2006.01) | |
| *G07C 5/08* | (2006.01) | |
| *B29C 73/16* | (2006.01) | |
| *B29L 30/00* | (2006.01) | |

(52) U.S. Cl.
CPC ............... *G07C 5/085* (2013.01); *B29C 73/166* (2013.01); *B29L 2030/00* (2013.01)
USPC ...................... 340/457; 340/457.4; 340/425.5; 340/442; 340/431

(58) Field of Classification Search
USPC .............. 340/457–457.4, 425.5, 309.16, 540, 340/584, 442–448, 431, 441; 702/176–178, 702/184, 79; 701/30, 30.4; 368/10, 12, 89
See application file for complete search history.

(56) References Cited

U.S. PATENT DOCUMENTS

| | | |
|---|---|---|
| D286,782 S | 11/1986 | Somers |
| 4,658,465 A | 4/1987 | Keane et al. |
| 4,756,697 A | 7/1988 | Hefling |

(Continued)

FOREIGN PATENT DOCUMENTS

| | | |
|---|---|---|
| CN | 101372196 A | 2/2009 |
| CN | 101372197 A | 2/2009 |

(Continued)

OTHER PUBLICATIONS

U.S. Appl. No. 95/000,581, filed Apr. 13, 2010, Steele.

(Continued)

*Primary Examiner* — Anh V La
(74) *Attorney, Agent, or Firm* — Jones Robb PLLC; Raymond L. Coppiellie

(57) ABSTRACT

A status indicator and reminder system for a temporary mobility kit for use in a vehicle having a tire pressure monitoring system. A tire sealant containing temporary mobility kit is fittable within the vehicle. A controller coupled to the temporary mobility kit and the tire pressure monitoring system will generate a service warning signal for the temporary mobility kit in response to information provided by the tire pressure monitoring system. The service warning signal will be provided at a message center in the vehicle to apprise the driver of the need to service the temporary mobility kit. The status indicator and reminder system may also utilize inputs from a power load monitor and a trailer brake controller system to generate and display a service warning signal at the message center.

27 Claims, 8 Drawing Sheets

(56) References Cited

U.S. PATENT DOCUMENTS

| | | |
|---|---|---|
| D301,887 S | 6/1989 | Price et al. |
| 5,442,669 A | 8/1995 | Medin |
| 5,455,735 A | 10/1995 | Zerega |
| 5,705,977 A | 1/1998 | Jones |
| 5,721,527 A | 2/1998 | Simmons et al. |
| 5,908,145 A | 6/1999 | Jaksa |
| 5,910,931 A | 6/1999 | Pettyjohn |
| 5,941,577 A | 8/1999 | Musellec |
| 6,092,569 A | 7/2000 | Simmel et al. |
| 6,283,172 B1 | 9/2001 | Thurner |
| 6,301,901 B1 | 10/2001 | Coffee et al. |
| 6,428,348 B1 | 8/2002 | Bean |
| 6,431,225 B1 | 8/2002 | Dudley |
| 6,445,967 B1 | 9/2002 | Travagline et al. |
| 6,490,543 B1 | 12/2002 | Jaw |
| 6,501,390 B1 | 12/2002 | Chainer et al. |
| 6,618,261 B1 | 9/2003 | Gaboury et al. |
| 6,668,875 B2 | 12/2003 | Kojima et al. |
| 6,736,170 B2 | 5/2004 | Eriksen et al. |
| 6,766,834 B1 | 7/2004 | Eckhardt |
| 6,784,794 B1 | 8/2004 | McQuade et al. |
| 6,789,581 B2 | 9/2004 | Cowan et al. |
| 6,795,376 B2 | 9/2004 | Quine |
| 6,812,825 B1 | 11/2004 | Volk |
| 6,829,520 B1 | 12/2004 | Green |
| 6,904,932 B1 | 6/2005 | Haraughty |
| 6,922,154 B2 | 7/2005 | Kraljic et al. |
| 6,938,651 B1 | 9/2005 | Carter et al. |
| 6,964,284 B2 | 11/2005 | Eckhardt |
| 6,985,078 B2 | 1/2006 | Suzuki et al. |
| 6,985,408 B2 | 1/2006 | Quine |
| 7,026,922 B1 | 4/2006 | Talukder et al. |
| 7,092,804 B2 | 8/2006 | McQuade et al. |
| 7,118,017 B1 | 10/2006 | Geraghty et al. |
| 7,289,016 B2 | 10/2007 | Luebke et al. |
| D557,299 S | 12/2007 | Marini et al. |
| 7,538,660 B2 * | 5/2009 | Murakami ............ 340/442 |
| D613,320 S | 4/2010 | Marini |
| 7,694,698 B2 | 4/2010 | Marini |
| 7,695,312 B2 | 4/2010 | Steele et al. |
| 7,789,110 B2 | 9/2010 | Marini |
| 7,798,183 B2 | 9/2010 | Cegelski et al. |
| 7,828,336 B2 | 11/2010 | Gammons |
| 7,878,360 B2 | 2/2011 | Takeda |
| 8,115,615 B2 * | 2/2012 | Miller et al. ............ 340/457 |
| 8,181,676 B2 | 5/2012 | Steele et al. |
| 8,245,737 B2 | 8/2012 | Stehle |
| 8,251,105 B2 | 8/2012 | Lolli et al. |
| 2001/0017134 A1 | 8/2001 | Bahr |
| 2003/0047652 A1 | 3/2003 | Eckhardt |
| 2004/0159365 A1 | 8/2004 | Cowan et al. |
| 2005/0191193 A1 | 9/2005 | Chou |
| 2005/0284536 A1 | 12/2005 | Kojima et al. |
| 2005/0284980 A1 | 12/2005 | Chang |
| 2006/0021472 A1 | 2/2006 | Ragan et al. |
| 2007/0048453 A1 | 3/2007 | Qin et al. |
| 2007/0113369 A1 | 5/2007 | Cochran et al. |
| 2007/0181209 A1 | 8/2007 | Stehle |
| 2008/0060734 A1 | 3/2008 | Stehle |
| 2008/0277044 A1 | 11/2008 | Marini |
| 2009/0050232 A1 | 2/2009 | Guan et al. |
| 2009/0066487 A1 | 3/2009 | Miller et al. |
| 2009/0107578 A1 | 4/2009 | Trachtenberg et al. |
| 2009/0193937 A1 | 8/2009 | Steele et al. |
| 2009/0266440 A1 | 10/2009 | Lolli et al. |
| 2009/0301602 A1 | 12/2009 | Lolli et al. |
| 2010/0005930 A1 | 1/2010 | Lolli et al. |

FOREIGN PATENT DOCUMENTS

| | | |
|---|---|---|
| CN | 101380877 A | 3/2009 |
| CN | 101497247 A | 8/2009 |
| DE | 4305172 A1 | 8/1994 |
| DE | 19527894 A1 | 1/1997 |
| DE | 19709445 A1 | 9/1998 |
| DE | 102008028926 A1 | 2/2009 |
| DE | 102008026726 A1 | 3/2009 |
| DE | 102009005849 A1 | 5/2009 |
| EP | D178983 | 8/2004 |
| EP | D535034 | 8/2004 |
| EP | 1747878 A1 | 1/2007 |
| EP | D656798 | 2/2007 |
| GB | 2331053 A | 5/1999 |
| GB | 2452137 A | 2/2009 |
| GB | 2452601 A | 3/2009 |
| JP | 2000238144 A | 9/2000 |
| JP | 2001212883 A | 8/2001 |
| WO | WO 2005/085028 | 9/2005 |
| WO | WO-2006024534 A1 | 3/2006 |
| WO | WO-2007048453 A1 | 5/2007 |
| WO | WO 2007/102066 | 9/2007 |
| WO | WO 2008/001179 | 1/2008 |
| WO | WO-2008035163 A2 | 3/2008 |
| WO | WO 2009/019590 | 2/2009 |
| WO | WO 2009027792 | 3/2009 |
| WO | WO 2009156817 | 12/2009 |

OTHER PUBLICATIONS

U.S. Appl. No. 11/894,390, filed Feb. 26, 2009, Yingchao Huan.
U.S. Appl. No. 12/023,542, filed Aug. 6, 2009, Steele.
Richards, John, Letter of Jun. 28, 2010 from TEK Global contesting inventorship, 2 pages.
U.S. Patent No. 7,695,312 titled "Cord Wrap and Power Receptacle Arrangement for Inflator" Is now Inter Partes Reexamination No. 95/000581, filed Dec. 9, 2010.
Stop & Go International, "Tire Mobility Kit" product details, 1998, 2 pages, www.stopngo.com/Contents/5000.asp.
Mona, "Fix-a-Flat: Spare Yourself Some Grief", www.epinions.com/content_254719790724, Sep. 15, 2006, 4 pages.
English translation of Japanese Unexamined Patent Publication (Kokai) No. 2000-238144.
English translation of Japanese Unexamined Patent Publication (Kokai) No. 2001-212833.
English language copy of Notification of First Office Action issued Feb. 29, 2012 in related Chinese Application No. 200810147524.8.
English language copy of Notification of Second Office Action issued Sep. 29, 2012 in related Chinese Application No. 200810147524.8.
English language copy of Notification of Third Office Action issued Mar. 11, 2013 in related Chinese Application No. 200810147524.8.
Letter from John Richards dated May 31, 2012 regarding U.S. Appl. No. 12/023,542.
Paul Williams, "Product Review: AirMan Tire Repair System", Canadian Driver, Oct. 15, 2004, 3 pages.
Author Unknown, "Notes on the safe use of the ContiComfort Kit," www.conticomfortkit.co.uk, Jul. 2007.
Author Unknown, TEK 2005 Product Literature, Nov. 2005.
Office Action dated Jul. 2, 2009 from U.S. Appl. No. 12/179,982, now Patent No. 7,695,312.
Reply to Office Action dated Jul. 2, 2009 from U.S. Appl. No. 12/179,982, now Patent No. 7,695,312.
Office Action dated Jun. 10, 2010 from U.S. Appl. No. 12/714,769.
Reply to Office Action dated Jun. 10, 2010 from U.S. Appl. No. 12/714,769.
Office Acton dated Feb. 1, 2011 from U.S. Appl. No. 12/714,769.
Reply to Office Action dated Feb. 1, 2011 from U.S. Appl. No. 12/714,769.
Office Action dated Nov. 16, 2011 from U.S. Appl. No. 12/714,769.
Reply to Office action dated Nov. 16, 2011 from U.S. Appl. No. 12/714,769.
Office Action dated Apr. 27, 2012 from U.S. Appl. No. 12/714,769.
Reply to Office Action dated Apr. 27, 2012 from U.S. Appl. No. 12/714,769.
Office Action dated Aug. 2, 2011 from U.S. Appl. No. 12/023,542, now Patent No. 8,276,624.
Reply to Office Action dated Aug. 2, 2011 from U.S. Appl. No. 12/023,542, now Patent No. 8,276,624.
Office Action dated Feb. 15, 2012 from U.S. Appl. No. 12/023,542, now Patent No. 8,276,624.

(56) References Cited

OTHER PUBLICATIONS

Reply to Office Action dated Feb. 15, 2012 from U.S. Appl. No. 12/023,542, now Patent No. 8,276,624.
Office Action dated Apr. 10, 2012 from U.S. Appl. No. 12/023,542, now Patent No. 8,276,624.
Reply to Office Action dated Apr. 10, 2012 from U.S. Appl. No. 12/023,542, now Patent No. 8,276,624.
Amendment after Final dated Jun. 27, 2012 form U.S. Appl. No. 12/023,542, now Patent No. 8,276,624.
Office Action dated Apr. 7, 2011 from U.S. Appl. No. 11/852,275, now Patent No. 8,115,615.
Reply to Office Action dated Apr. 7, 2011 from U.S. Appl. No. 11/852,275, now Patent No. 8,115,615.
Office action dated Feb. 18, 2011 from U.S. Appl. No. 11/894,390, now Patent No. 8,146,622.
Reply to Office action dated Feb. 18, 2011 from U.S. Appl. No. 11/894,390, now Patent No. 8,146,622.
Office action dated Sep. 20, 2011 form U.S. Appl. No. 11/894,390, now Patent No. 8,146,622.
Reply to Office action dated Sep. 20, 2011 form U.S. Appl. No. 11/894,390, now Patent No. 8,146,622.
Office Action dated Feb. 22, 2011 from U.S. Appl. No. 12/963,628, now Patent No. 8,181,676.
Reply to Office Action dated Feb. 22, 2011 from U.S. Appl. No. 12/963,628, now Patent No. 8,181,676.
Office Action dated Sep. 20, 2011 from U.S. Appl. No. 12/963,628, now Patent No. 8,181,676.
Reply to Office Action dated Sep. 20, 2011 from U.S. Appl. No. 12/963,628, now Patent No. 8,181,676.
Office Action dated Apr. 25, 2011 from U.S. Appl. No. 13/415,652.
Reply to Office Action dated Apr. 25, 2011 from U.S. Appl. No. 13/415,652.
Office Action dated Sep. 26, 2012 from U.S. Appl. No. 13/415,652.
Reply to Office Action dated Sep. 26, 2012 from U.S. Appl. No. 13/415,652.
Inter Partes request dated Dec. 9, 2010 from U.S. Appl. No. 95/000,581.
Determination that Reexam Ordered dated Jan. 12, 2011 from U.S. Appl. No. 95/000,581.
Office Action dated Jan. 20, 2011 from U.S. Appl. No. 95/000,581.
Applicant Reply dated Mar. 21, 2011 from U.S. Appl. No. 95/000,581.
Third Party Requester Reply dated Apr. 21, 2011 from U.S. Appl. No. 95/000,581.
Office Action dated Sep. 20, 2011 from U.S. Appl. No. 95/000,581.
Patent Owner Comments dated Nov. 19, 2011 from U.S. Appl. No. 95/000,581.
Third Party Requester Comments dated Dec. 19, 2011 from U.S. Appl. No. 95/000,581.
Right of Appeal Notice dated Jan. 20, 2012 from U.S. Appl. No. 95/000,581.
Owner Appeal Brief dated Apr. 17, 2012 from U.S. Appl. No. 95/000,581.
Respondent Brief-Owner dated May 2, 2012 from U.S. Appl. No. 95/000,581.
Examiner's Answer dated Jul. 27, 2012 from U.S. Appl. No. 95/000,581.
Requester Rebuttal Brief dated Aug. 27, 2012 fro U.S. Appl. No. 95/000,581.
Inter Partes request dated Sep. 14, 2012 from U.S. Appl. No. 95/000,692.
Response dated Jan. 4, 2013 from U.S. Appl. No. 95/000,692.
Reexam Office Action dated Nov. 8, 2012 from U.S. Appl. No. 95/000,692.
Determination that Reexam Ordered dated Nov. 8, 2012 from U.S. Appl. No. 95/000,692.
Third Party Requester Comments dared Feb. 1, 2013 from U.S. Appl. No. 95/000,692.
Decision on Appeal dated Aug. 6, 2013 from U.S. Appl. No. 95/000,581.
Office Action dated Feb. 3, 2014 from U.S. Appl. No. 13/686,503.
Office Action dated Jun. 9, 2014 from U.S. Appl. No. 13/686,503.
Office Action dated Jul. 7, 2014, from U.S. Appl. No. 13/893,177.
Office Action dated Jan. 17, 2014 from U.S. Appl. No. 13/343,290.
Office Action dated Jun. 30, 2014 from U.S. Appl. No. 13/343,290.

* cited by examiner

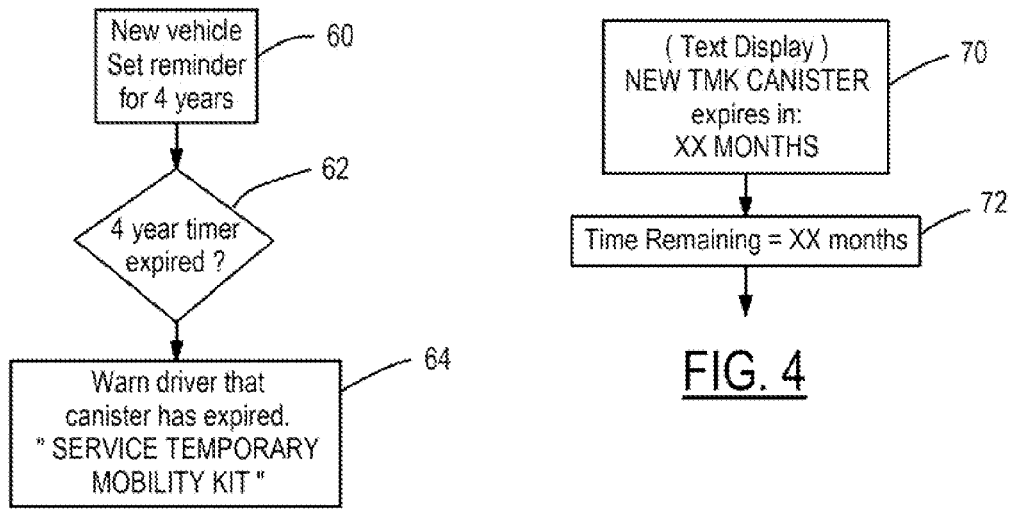
FIG. 3
FIG. 4
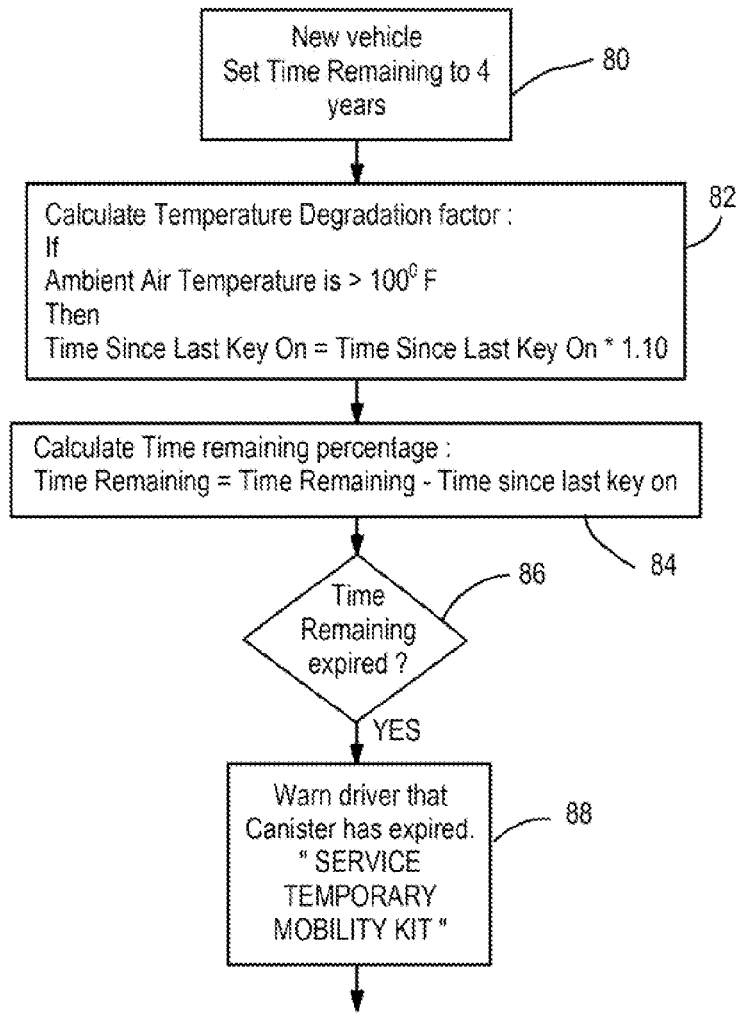
FIG. 5

STATUS INDICATOR AND REMINDER SYSTEM FOR VEHICLE TEMPORARY MOBILITY KIT

CROSS REFERENCE TO RELATED APPLICATIONS

This application is a continuation-in-part of U.S. application Ser. No. 11/852,275, filed on Sep. 8, 2007, now U.S. Pat. No. 8,115,615, herein incorporated by reference.

TECHNICAL FIELD

The inventive subject matter relates generally to portable inflator units. More particularly, the inventive subject matter relates to a status indicator and reminder system for a tire sealant-containing temporary mobility kit in a vehicle.

BACKGROUND OF THE INVENTION

Automotive manufacturers have traditionally offered spare tires with the fleet of vehicles they produce. In the early days of automobiles the spare tire was mounted externally on either the running board or on a rear-mounted tire carrier. To comply with advances in styling the spare tire was concealed, most typically being moved inside the vehicle's trunk. While this arrangement provided a suitable solution for placement of the spare tire for decades, changes in fuel economy requirements dictated the need for vehicle weight reduction. Manufacturers reviewed the vehicle anew in its entirety seeking ways to reduce vehicle weight. One answer to the effort to reduce overall vehicle weight was to replace the conventional, large and bulky road tire with a smaller temporary tire or "donut."

While the temporary tire represented a significant decrease in overall vehicle weight, the further improvement in tire design and durability as well as the concurrent general improvement in roadways gradually began to reduce the need for relying on a spare tire at all.

In response to these advances in both tire technology and road quality, vehicle auto manufacturers have begun to substitute a "temporary mobility kit" (or "TMK") for the spare tire. The TMK includes a dual-purpose air compressor and a sealing system. The sealing system includes a sealing compound that will effectively seal most punctures caused by nails or similar objects. The air compressor drives the sealing compound into the compromised tire and, subsequently, can be used to reinflate the tire. The growing trend today is for manufacturers to equip the vehicle with a temporary mobility kit within a space provided in the vehicle, such as (but not exclusively) in the spare tire well of the trunk.

Like the spare tire which it effectively (if not actually) replaces, the temporary mobility kit is disposed well out of the way of the vehicle operator and thus is frequently overlooked as part of ordinary vehicle maintenance. However, while the sealing and flow characteristics of the sealant of the temporary mobility kit are largely resistant to the passage of time while stored in the substantially oxygen-free environment of the sealant canister, eventually attention must be given to the temporary mobility kit according to a fairly predictable schedule.

Further, when the TMK is used, it is removed from the vehicle, the tire is inflated so that repairs may be made, and the kit is typically returned to the vehicle. The TMK is designed for a single use and upon use, it must be service.

While providing clear advantages over the weight demands of the spare tire as well as providing the vehicle operator with a practical alternative over the demands of tire changing, as in most every area of vehicle technology the development of temporary mobility kits and their relation to the vehicle are in a continuing state of development.

SUMMARY OF THE INVENTION

A preferred embodiment of the disclosed invention is a status indicator and reminder system for use with a vehicle where the vehicle includes a tire sealant-containing temporary mobility kit. The system includes an indicator mounted on the vehicle's instrument panel, a timer for generating a time signal corresponding to a time duration the temporary mobility kit has been in position in the vehicle, and a controller coupled to the indicator and the timer. The controller generates a service warning signal in response to the timer signal. As a variation a temperature sensor is additionally included which generates a temperature profile which can be used to modify the timer signal in the case where higher temperatures result in possible degradation of the tire sealant. An additional variation of the system is provided in which a feedback system is used to notify the operator that servicing of the temporary mobility kit may be necessary because the kit has been removed from the vehicle. A re-set arrangement is further provided to allow the operator to re-set the system after servicing of the temporary mobility kit.

In other embodiments of the inventive subject matter, a status indicator and reminder system for a temporary mobility kit uses information provided by a tire pressure monitoring system on the vehicle. A tire sealant containing temporary mobility kit is fittable within the vehicle. A controller coupled to the temporary mobility kit and the tire pressure monitoring system will generate a service warning signal for the temporary mobility kit in response to information provided by the tire pressure monitoring system. The service warning signal will be provided at a message center in the vehicle to apprise the driver of the need to service the temporary mobility kit. The status indicator and reminder system may also utilize inputs from a power load monitor and a trailer brake controller system to generate and display a service warning signal at the message center Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein:

FIG. 3 is a flow chart according to a first embodiment of the disclosed invention;

FIG. 4 is a flow chart illustrating the steps needed to re-set the system;

FIG. 5 is a flow chart according to a second embodiment of the disclosed invention;

DETAILED DESCRIPTION OF THE PREFERRED EMBODIMENT

Figure 1:
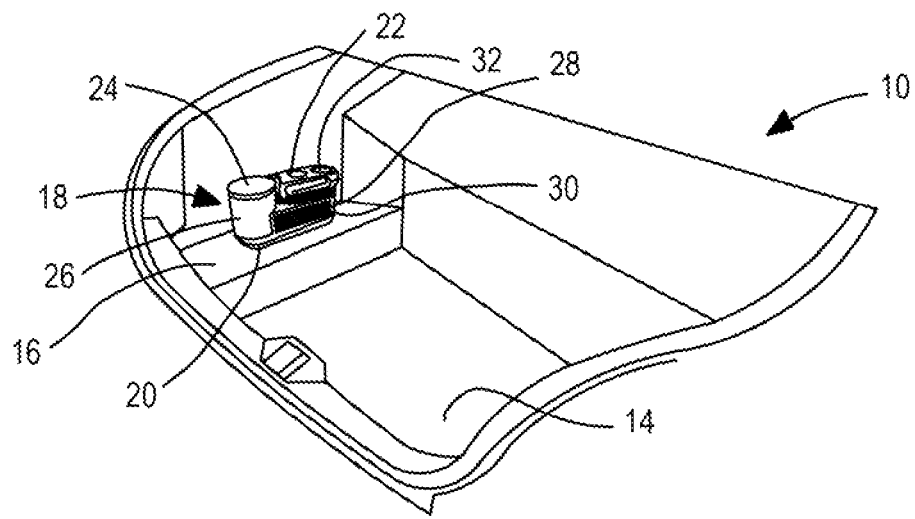
FIG. 1 illustrates a perspective view of an opened trunk of a vehicle showing the temporary mobility kit in its stored position.

In the following figures, the same reference numerals will be used to refer to the same components. In the following description, various operating parameters and components are described for one constructed embodiment. These specific parameters and components are included as examples and are not meant to be limiting.

The disclosed invention teaches a status indicator and reminder system for a temporary mobility kit (occasionally referred to hereinafter as "TMK") for use with any vehicle having pneumatic tires. The temporary mobility kit may be located in many places on a vehicle, but is preferably located in the vehicle's trunk in place of (or in conjunction with) the vehicle's spare tire. Referring to FIG. 1, a perspective view of a vehicle trunk, generally illustrated as 10, is shown. The trunk 10 is formed in a particular shape to conform to the rear wheel wells, fuel tank and other components of the vehicle and includes a generally vertical front wall, commonly referred to as the waterfall. The trunk 10 also includes a floor 14 and a shelf or side ledge 16.

A temporary mobility kit 18 is shown positioned in a docking station 20 formed in the side ledge 16. The temporary mobility kit 18 includes a switch-inflator assembly 22 and a sealant assembly 24. The sealant assembly 24 includes a sealant canister 26 which contains a flowable tire sealant compound. The switch-inflator assembly 22 includes a sealant hose 28 and an air hose 30. A selector switch 32 is provided with the switch-inflator assembly 22. In use, the operator attaches the sealant hose 28 to the damaged vehicle tire and manipulates the selector switch 32 so that the sealant compound flows out of the sealant canister 26 of the sealant assembly 24 and into the compromised tire by way of the sealant hose 28. Once the provided quantity of sealant compound has been exhausted, the operator then manipulates the selector switch 32 so that air flows through the sealant hose 28 to re-fill the tire. In the event that only air and not sealant is needed, the operator attaches the air hose 30 to the article needing inflation and the sealant function is not used. (The temporary mobility kit 18 and the elements described above are more clearly seen in FIGS. 6 and 7.)

The position of the docking station 20 is only illustrative as the temporary mobility kit 18 may be disposed in a number of areas in the trunk 10 (or, in fact, in the vehicle itself), including, for example, the well formed for the spare tire.

Over time it may well become necessary for attention to be given to the sealant canister 26 of the temporary mobility kit 18, either because of age of the sealant compound or because of possible use of the compound. It is ordinary for a vehicle operator to need to be reminded or informed of the status of a vehicle component, and the temporary mobility kit 18 is no exception.

Figure 2:
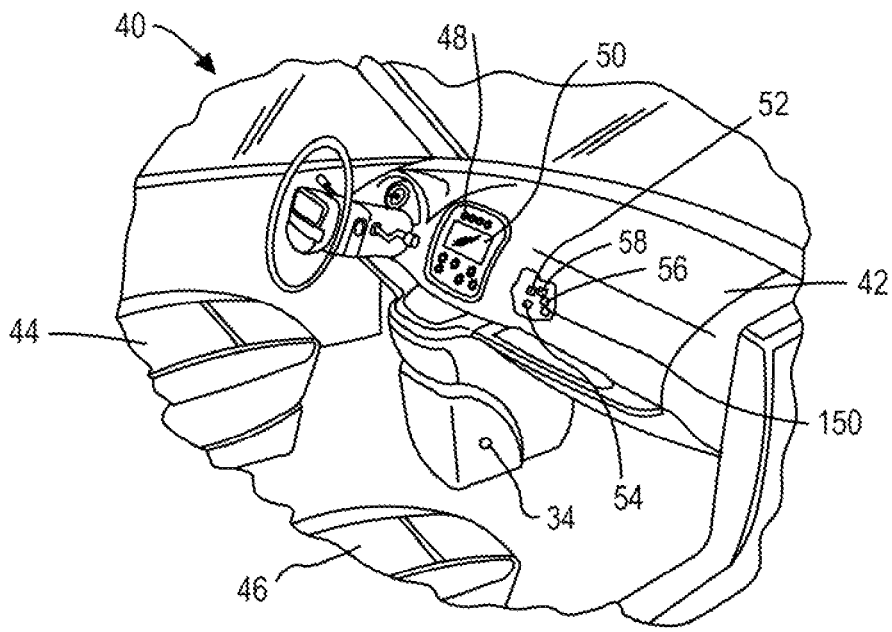
FIG. 2 illustrates a partial perspective view of a vehicle interior including the vehicle's instrument panel.

Referring to FIG. 2, a partial perspective view of the interior of a vehicle, generally illustrated as 40, is shown. The vehicle interior includes an instrument panel 42, a driver seat 44, and a passenger seat 46. Located on the instrument panel 42 is a message center 48. While the message center 48 is illustrated as being centrally located on the instrument panel 42, it is to be understood that the message center 48 may be located in other places relative to the instrument panel, such as by the instrument cluster located forward of the steering wheel. Alternatively, the message center 48 may be incorporated into the vehicle's overhead console, if present.

Regardless of the placement of the message center 48, a status/reminder indicator 50 is provided on the message center 48. The status/reminder indicator 50 is preferably a visual indicator, but may be an audio indicator as well. The status/reminder indicator 50 is provided to inform the driver that attention must be given to the temporary mobility kit, either because the sealant component of the TMK is nearing or has passed its estimated useful life or because the TMK has been removed from the vehicle and the sealant component may need to be replaced. The status/reminder indicator 50 may be a simple light, a light having an illuminated message ("Service Temporary Mobility Kit"), or a simple message ("Service Temporary Mobility Kit"). The status/reminder indicator 50 is operatively associated with a controller 52 which is itself associated with a timer 54. In addition, a temperature sensor 56 is also operatively associated with the controller 52. It is to be noted that the placement of the controller 52, the timer 54, and the temperature sensor 56 is shown for illustrative purposes only, and these elements can be placed at other places in the vehicle. Also it is to be understood that while a temperature sensor is provided as sensor 56 herein it may well be that no additional sensor is required. This is the case particularly with newer vehicles in which temperature sensors are ordinarily provided as part of the vehicle network. However, an additional temperature sensor may be provided with the temporary mobility kit 18 in relation to the sealant canister 26.

FIG. 3 illustrates an algorithm according to a first embodiment of the disclosed invention to determine whether or not a signal should be sent to the message center 48 indicating that attention needs to be given to the temporary mobility kit 18. At a first step 60 the system is programmed to send a reminder to the message center 48 after a predetermined period, the period being assessed by the timer 54. As illustrated in step 60, the selected predetermined period is four years but any other period may be established. At a second step 62 a query is made as to whether or not the predetermined period has passed as assessed by the timer 54. At a third step 64, if the answer to the query at the second step 62 is "yes," then a message is sent by the controller 52 to the message center 48 in the form of an indication by the status/reminder indicator 50 that the life of the sealant canister 26 has expired and a replacement unit is needed.

Once the life of the sealant canister 26 has expired, the service message has been provided to the operator, and the sealant canister 26 has been replaced, it will be necessary for the system to be re-set to a new expiration date. Referring to FIG. 4, an algorithm which illustrates the re-set steps is provided. At a first step 70, a text is displayed by the status/ indicator light 50 in which language appears asking the person undertaking the re-set to enter a new expiration period. In the illustrated example the re-set time is given in months. At a second step 72 a reset time (again, according to the illustration, in months) is entered by the operator and the controller 52 is re-set. While there would not ordinarily be an indication of the status of the temporary mobility kit 18 if neither the effective time has expired nor has the kit 18 been used, it is possible that the status of the temporary mobility kit 18 could be indicated if the operator manipulates, for example, a "system check" button. In that event the time remaining before service for the temporary mobility kit 18 may be indicated.

While the algorithm in FIG. 3 discloses a simple, time-dependent approach to signaling the operator of the need to attend to the temporary mobility kit 18, it is possible that other variables can be taken into account to determine the effective life of the kit 18. For example, such variables may include ambient conditions such as temperature and pressure or may include other conditions experienced by the vehicle, such as vibration. By way of example, FIG. 5 discloses an algorithm having multiple variables, specifically including time and temperature variables. At a first step 80 the system is programmed to send a reminder to the message center 48 after a predetermined period, the period being assessed by the timer 54. As illustrated in step 80, the selected predetermined period is four years but any other period may be established. At a second step 82 the system calculates any degradation that may have been caused by elevated temperatures over time (in the illustrated case, at a temperature greater than 100° F.), the ambient temperature being determined by a temperature sensor 56.

At a third step 84 the system calculates the time remaining as assessed by the tinier 54, taking into account the information generated at the second step 82. At a fourth step 86 the system takes into account the information generated at the third step 84 and queries whether or not the sealant canister 26 is expired. At a fifth step 88, if the answer to the query at the fourth step 86 is "yes," then a message is sent by the controller 52 to the message center 48 in the form of an indication by the status/reminder indicator 50 that service is required. If replacement of the sealant canister 26 is required, a re-set operation set forth in the algorithm of FIG. 4 is then undertaken after the sealant canister 26 has, in fact, been changed.

Accordingly the system disclosed herein may provide not only a reminder to the operator that a change of the sealant canister 26 is needed based on either the simple passage of time or on the passage of time as may be modified by certain ambient conditions. However, and as set forth above, the system may also provide information as to whether or not the temporary mobility kit 18 has been removed from the vehicle. It is to be understood that the temporary mobility kit 18 may be used for purposes other than sealing and refilling a damaged tire, since it is provided with the air hose 30 which may be used to inflate a tire which is not damaged. But, as a precaution, the system of the disclosed invention may alert the operator in the event that the temporary mobility kit 18 has been removed regardless of the reason, leaving it to the operator to re-set the system according to the method set forth in FIG. 4 and discussed in relation thereto.

A feedback component is provided to indicate to the driver that attention must be given to the temporary mobility kit 18 once it is removed from the vehicle. This warning will occur even if the temporary mobility kit 18 is reconnected with the vehicle. The removal of the temporary mobility kit 18 from the vehicle may be indicated in any of several ways, which generally include a break in a hard connection or by an adjacent sensor electrically sensing, without a direct connection, that the temporary mobility kit 18 has been moved.

Figure 6:
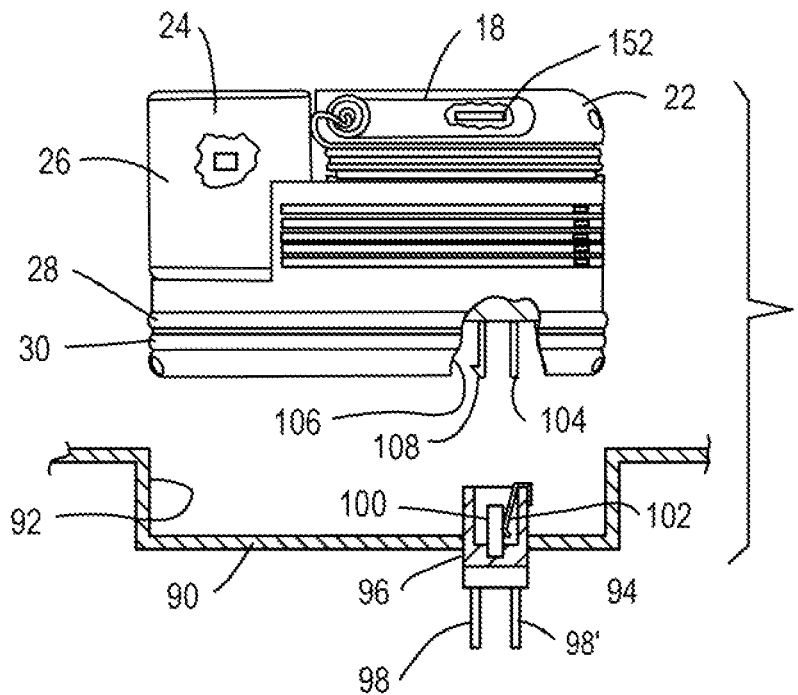
FIG. 6 illustrates a side view of the temporary mobility kit positioned above its docking station in the vehicle, shown in partial sectional view.
Figure 7:
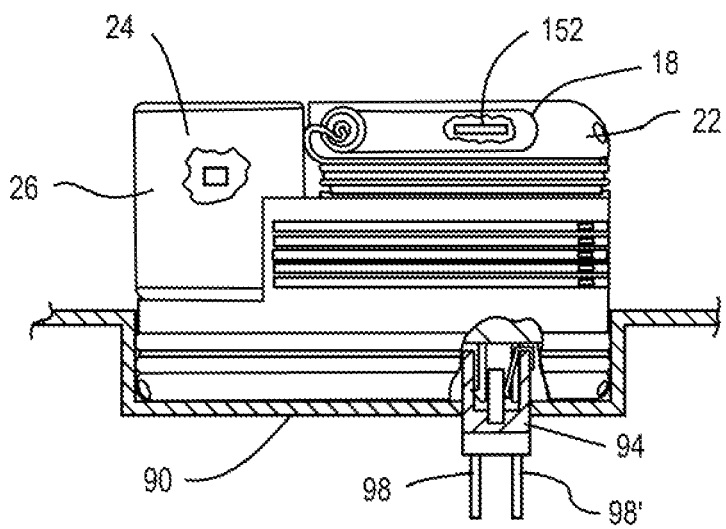
FIG. 7 is a view similar to that of FIG. 6 but illustrating the temporary mobility kit having been inserted into its docking station.

While either of these general systems may be employed in the disclosed invention, a preferred approach in the form of a shorting bar, is set forth in FIGS. 6 and 7. The temporary mobility kit 18 is positioned above and spaced apart from a docking system 90 which includes a kit receiving recessed area 92 and a conduit 94. The conduit 94 includes a housing 96 and a pair of lead wires 98, 98' which are integrated with the vehicle's electrical system to provide information as to the continuity of the circuit. The lead wires 98, 98' are electrically connected to a pair of parallel prongs 100 (only one is shown) in the housing 96. The shorting bar comprises a spring metal blade 102 normally spanning the two prongs, whereby a circuit is established across the lead wires 98, 98'. When the temporary mobility kit 18 is manipulated toward the docking system 90, a dielectric plate 104 extending from the upper wall of a recessed area 106 formed in the base of the temporary mobility kit 18 deflects the spring metal blade 102 away from the prongs 100, thereby interrupting the circuit, as illustrated in FIG. 7. A latch arm 108 also extends from the tipper wall of the recessed area 106 for releasably holding the temporary mobility kit 18 to the docking system 90.

Figure 8:
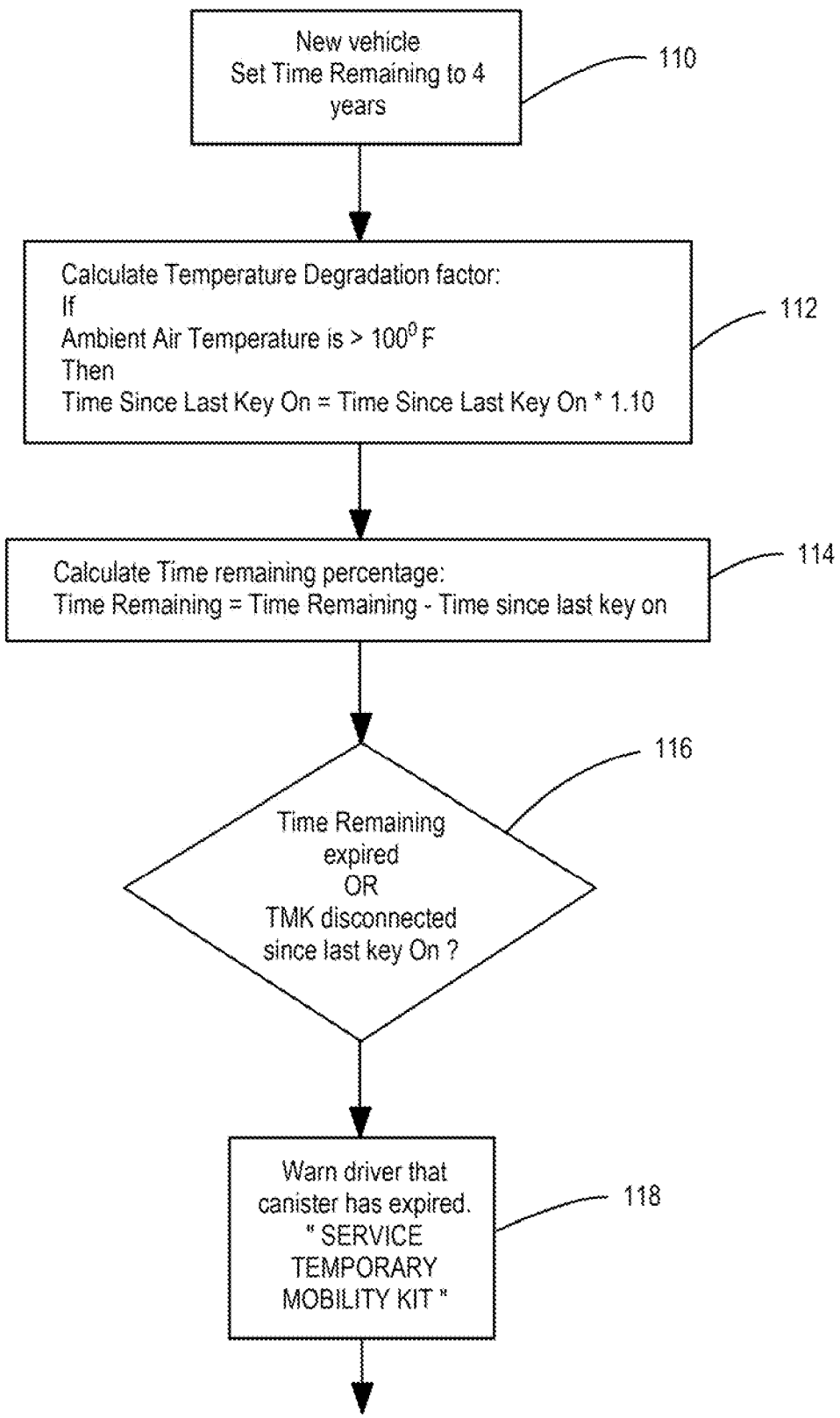
FIG. 8 is a flow chart according to a third embodiment of the disclosed invention.

An algorithm for interpreting and conveying information regarding the disconnection and presumed use of the temporary mobility kit 18 from the vehicle is set forth in FIG. 8. The first three steps parallel the first three steps of the time and temperature dependent algorithm set forth in FIG. 8 and discussed in relation thereto. Specifically, at a first step 110 the system is programmed to send a reminder to the message center 48 after a predetermined period has passed, the period being assessed by the timer 54. In the illustrated instance the period is four years. At a second step 112 the system calculates any degradation that may have been caused by elevated temperatures over time), the ambient temperature being determined by a temperature sensor 56. At a third step 114 the system calculates the time remaining as assessed by the timer 54, taking into account the information generated at the second step 112.

At a fourth step 116 the system takes into account the information generated at the third step 114 and queries whether or not the sealant canister 26 is expired. In addition, at the fourth step 116 an additional query is made as to whether or not the temporary mobility kit 18 has been disconnected from the vehicle. The answer to this latter query is dependent upon whether or not the circuit operatively associated with the docking system 90 has been interrupted, as set forth above. At a fifth step 118, if the answer to either query at the fourth step 116 is "yes," then a message is sent by the controller 52 to the message center 48 in the form of an indication by the status/reminder indicator 50 that service is required. If replacement of the sealant canister 26 is required, a re-set operation set forth in the algorithm of FIG. 4 is then undertaken after the sealant canister 26 has, in fact, been changed.

Figure 9:
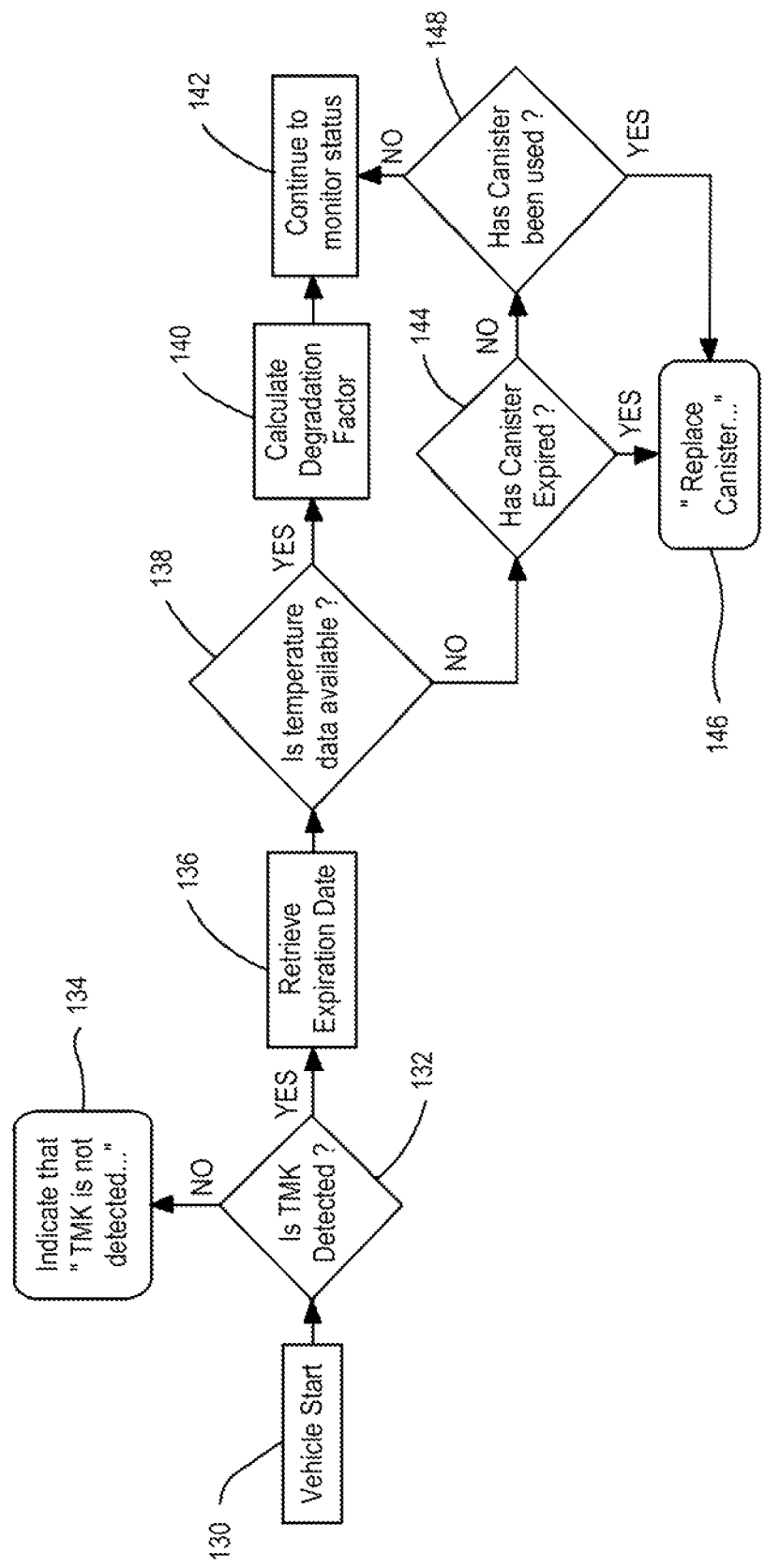
FIG. 9 is an alternate embodiment of the flow chart according to the third embodiment of the disclosed invention.

An alternative version of the algorithm for interpreting and conveying information regarding the disconnection and presumed use of the temporary mobility kit 18 from the vehicle is set forth in FIG. 9. According to this arrangement the procedures of the algorithm are initiated with the start of the vehicle at step 130. An initial inquiry is made as to whether or not the initiates an inquiry is made at step 130 whether or not the temporary mobility kit 18 is detected at step 132. If the temporary mobility kit 18 is not detected, then the status/ reminder indicator 50 provided on the message center 48 displays an appropriate signal at step 134. If, instead, a temporary mobility kit 18 is detected at step 132, then the expiration data is retrieved at step 136. An inquiry is then made at step 138 as to whether or not temperature data is available. If it is determined at step 138 that temperature data is available, then the degradation factor of the sealant is calculated at step 140 and, at step 142, then monitoring of the status of the temporary mobility kit 18 continues.

If, on the other hand, it is determined that no temperature data is available at step 138, then an inquiry is made at step 144 as to whether or not the contents of the sealant canister 26 has expired based on the initial install date of the canister. A determination at step 144 that the sealant canister 26 has, in fact, expired will cause, at step 146, an appropriate indication by the status/reminder indicator 50. A determination that the sealant canister 26 has not expired at step 144 will cause an inquiry to be made at step 148 whether or not the sealant canister 26 has been used. If it is determined that the sealant canister 26 has not been used at step 148, then its status will continue to be monitored and no message will be sent. If, on the other hand, it is determined that the sealant canister has been used, then an appropriate indication will be made by the status/reminder indicator 50.

Figure 10:
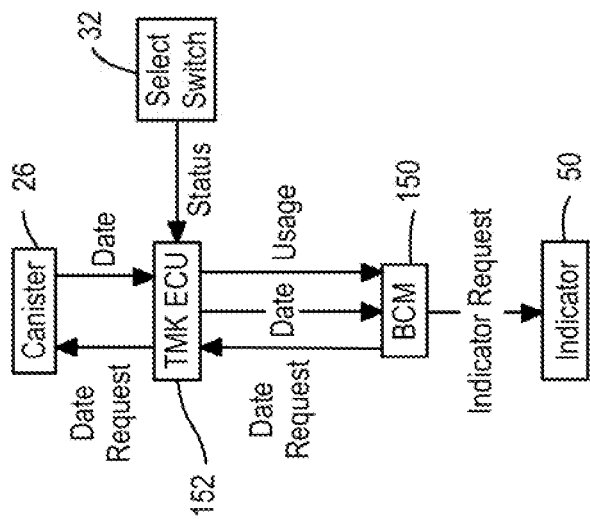
FIG. 10 is a data flow chart illustrating a first arrangement for monitoring temperature for use in the second and third embodiments of the disclosed invention.

The monitoring of ambient temperature and impact thereof on the tire sealant itself and the resulting analysis of whether or not an indication should be made that the sealant canister 26 should be changed may be made by different methods. Two of those methods are set forth herein as indicated by the data flow charts of FIGS. 10 and 11.

Figure 11:
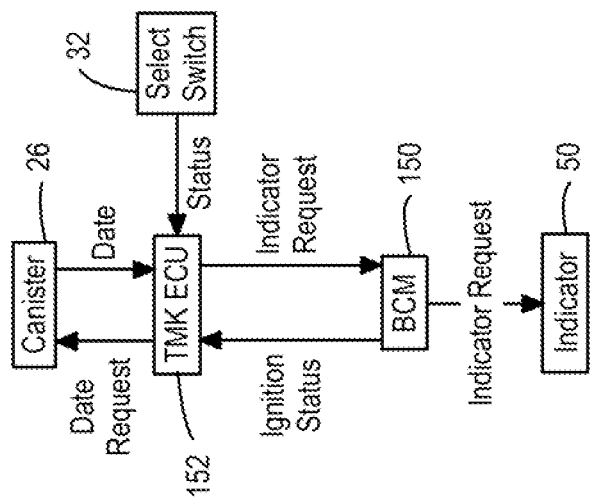
FIG. 11 is a data flow chart illustrating a second arrangement for monitoring temperature for use in the second and third embodiments of the disclosed invention.

With respect first to the data flow chart set forth in FIG. 11, data is initially requested by a body control module 150 (shown in a possible location relative to the instrument panel in FIG. 2, although it must be understood that the body control module 150 may be placed in a variety of other locations on the vehicle). An electronic control unit 152 of the temporary mobility kit 18 requests date information from the sealant canister 26. Once the electronic control unit 152 receives this information it sends this information as to the date as well as to usage of the temporary mobility kit 18 to the body control module 150. An indication will then be made by the status/reminder indicator 50 as deemed appropriate by the body control module 150.

An alternative approach to data flow is set forth in FIG. 11. In general, in this embodiment, all of the required system intelligence for responding to the need for replacing the sealant canister 26 is provided in the electronic control unit 152 of the temporary mobility kit 18. Thus the only interface required is an indication request from the temporary mobility kit 18 to the vehicle network. This may involve the above-noted temperature sensor on the sealant canister 26.

Particularly, according to the arrangement shown in FIG. 11, the body control module 150 sends information regarding the ignition status of the vehicle to the electronic control module 152 of the temporary mobility kit 18. The electronic control unit 152 of the temporary mobility kit 18 requests date information from the sealant canister 26. Once the electronic control unit 152 receives the date information it sends to the body control module 150 an indicator request. The body control module 150 interprets this information and initiates an indication by way of the status/reminder indicator 50 as deemed appropriate by the body control module 150.

As described above, a feedback component is provided to indicate to the driver that attention must be given to the temporary mobility kit 18 once it is removed from the vehicle. This warning will occur even if the temporary mobility kit 18 is reconnected with the vehicle. The removal of the temporary mobility kit 18 from the vehicle may be indicated in any of several ways, which may include inferring that the temporary mobility kit 18 has been used from information provided by a source other than the TMK itself. For example, a TPMS, a power load monitor and/or a TBC.

Referring again to FIG. 2, the vehicle may be equipped with one or more 12 volt accessory outlets 34. When the TMK is used, the compressor is typically plugged into one of the available voltage outlets to provide power to the unit. A power load monitor 58, which may be coupled to controller 52, 150, 152, or in the form of an algorithm in controller 52, 150, 152, monitors a load at the outlet 34. When the compressor of the temporary mobility kit is used, a power load at any one of the 12 volt accessory outlets used to power the compressor will occur. A minimum power load may be set as a threshold to indicate that the compressor is being used at an outlet. The power load monitor 58 may detect a power load that exceeds the predetermined minimum power threshold value stored in the controller. Furthermore, a certain amount of time is necessary run the compressor while re-inflating a tire using the compressor. Therefore, when the power load monitor 58 detects a power load that exceeds the predetermined minimum threshold value and that value is exceeded for a predetermined minimum amount of time, it may be inferred that the TMK was used to re-inflate a tire. However, there may be instances when the compressor is used but the tire sealant is not used. Therefore, to provide even more accuracy to the TMK monitoring system, the controller may prompt the driver, for example at the message center, to confirm that the tire sealant was in fact use, thereby generating an indicator at the message center reminding the driver that the TMK is in need of service.

Figure 12:
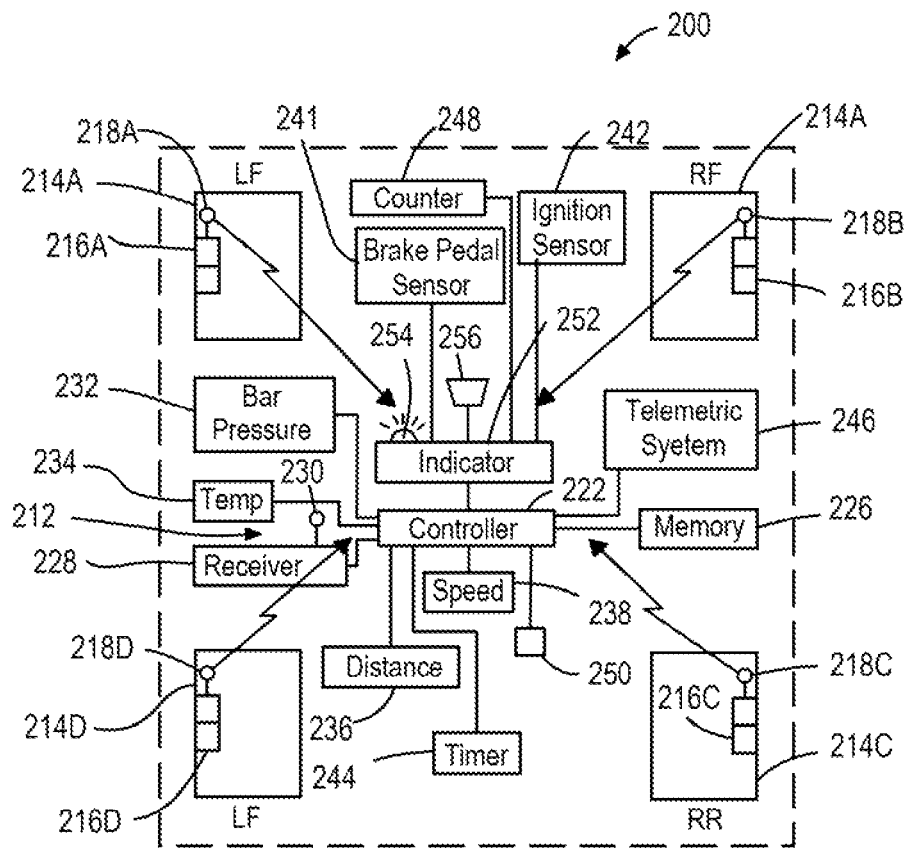
FIG. 12 is a block diagram of a prior art tire pressure monitoring system used in accordance with the inventive subject matter.

In another embodiment of the inventive subject matter, in a vehicle equipped with both a TMK and a tire pressure monitoring system (TPMS), information provided by the TPMS may be used to provide a status reminder/indicator 50 to the message center 48 that the sealant canister has been used and may be in need of service. FIG. 12 is a block diagram of a known tire pressure monitoring system 200 used in accordance with the inventive subject matter for monitoring the air pressure within a left front tire 214A, a right front tire 214B, a right rear tire 214C and a left rear tire 214D. Each tire 214A-214D has a respective tire pressure sensor circuit 216A, 216B, 216C, and 216D. Each sensor circuit 216A-216D has a respective antenna 218A, 218B, 218C and 218D. Each tire is positioned upon a corresponding wheel of a vehicle. While four tires are illustrated herein, it should be noted that the number of tires may be increased as necessary depending on the vehicle. For example, a spare tire may also be included on the vehicle and may be equipped with a pressure sensor circuit as well as an antenna. Another example is a truck having dual wheels at one or several locations that may have more tires than described in the present example.

Controller 222 has a memory 226 associated therewith. Memory 226 may be various types of memory including but not limited to ROM or RAM. Memory 226 is illustrated as a separate component. However, those skilled in the art will recognize controller 222 may have memory 226 incorporated therein. Memory 226 stores various thresholds, calibrations, tire characteristics, wheel characteristics, serial numbers, conversion factors, temperature probes, spare tire operating parameters, and other values needed in the calculation, calibration and operation of the tire pressure monitoring system 200. For example, memory 226 may contain a pareto that includes the sensor identification thereof. Also, any warning statuses of each of the tires may be stored within the memory 226.

Controller 222 is coupled to a receiver 228, which, like memory 226, may also be incorporated into the controller 222. Receiver 228 has an antenna 230 associated therewith.

Receiver 228 receives pressure and various information from tire pressure circuits 216A-16D. Controller 222 is also coupled to a plurality of sensors, including but not limited to, barometric pressure sensor 232, an ambient temperature sensor 234, a distance sensor 236, a speed sensor 238, a brake pedal sensor 241, and an ignition sensor 242. Controller 222 may also be coupled to a button, or a plurality of buttons, 250 for inputting information, resetting the controller 222, or other functions that will be evident to those skilled in the art through the following description. After maintenance is performed, an operator or dealer service will reset the TPMS 200 in order to learn the new warm placard pressure values. The method may vary based on the vehicle. The reset may include a dedicated TPMS reset button, or a TPMS reset menu screen in a cluster message center.

Ignition sensor 242 may be one of a variety of types of sensors to determine if the ignition is powered on. When the ignition is on, a run signal may be generated. When the ignition is off, an off signal may be generated. A simple ignition switch may act as an ignition sensor 242. Of course, sensing the voltage on a particular control line may also provide an indication of whether the ignition is activated.

A timer 244 may be used to measure various times associated with the process set forth herein. The timer 244, for example, may measure the time the vehicle is traveling above a predetermined threshold speed value. A telemetric system 246 may be used to communicate information to and from a central location on a vehicle. For example, the control location may keep track of service intervals and use information to inform the vehicle operator service is required. A counter 248 may also be included in the control system. Counter 248 may count the number of times a particular action is performed. For example, counter 248 may be used to count the number of times pressure measurements are stored in memory.

Controller 222 may also be coupled to an indicator 252. Indicator 252 may include an indicator light or display panel 254 which generates a visual signal or an audible device 256 such as a speaker or buzzer that generates an audible signal. Indicator 252 may provide some indication as to the operability of the system such as confirming receipt of a signal such as a calibration signal or other commands, warnings, and controls as will be discussed hereinafter. Indicator 252 may be an LED or LCD panel used to provide commands to the vehicle operator when manual calibrations are performed. The indicator 252 associated with the TPMS may also be the same message center 48 that is part of the instrument panel 42 which displays messages and/or status indicators 50 from the TMK. It should be noted that the TPMS presented herein is for example purposes only and another type of TPMS may also be used to implement the inventive subject matter as it associates information from the TPMS with the TMK.

The TPMS 200 is continually monitoring the tire pressure at each tire of the vehicle. The system 200 issues a warning when a tire pressure does not meet predetermined pressure requirements and will also recognize when the tire pressure deficiency has been addressed and corrected. This information may be supplied to the controller associated with the TMK monitoring system whereby the controller may prompt a driver, through the message center 48, to confirm whether the sealant canister 26 was used to re-inflate a tire and if so, the controller will provide a message to be displayed at the message center that the TMK may require attention and/or servicing. According to this embodiment of the inventive subject matter, upon detection by the TPMS that at least one tire pressure, once detected to be below a minimum pressure, has been re-inflated and is now at or above the minimum pressure, the TPMS will issue a signal that is used by the controller associated with the TMK monitoring system to infer that the sealant canister may have been used and a status indicator or warning message may need to be displayed at the message center. The controller associated with the TMK monitoring system will issue a prompt, at the message center, requesting input from the driver as to whether or not the sealant canister has been used to repair the tire. In the event the driver responds affirmatively, the controller will issue a status reminder/indicator 50 to the message center 48 prompting the driver to replace the sealant and reset the TMK service timer.

Figure 13:
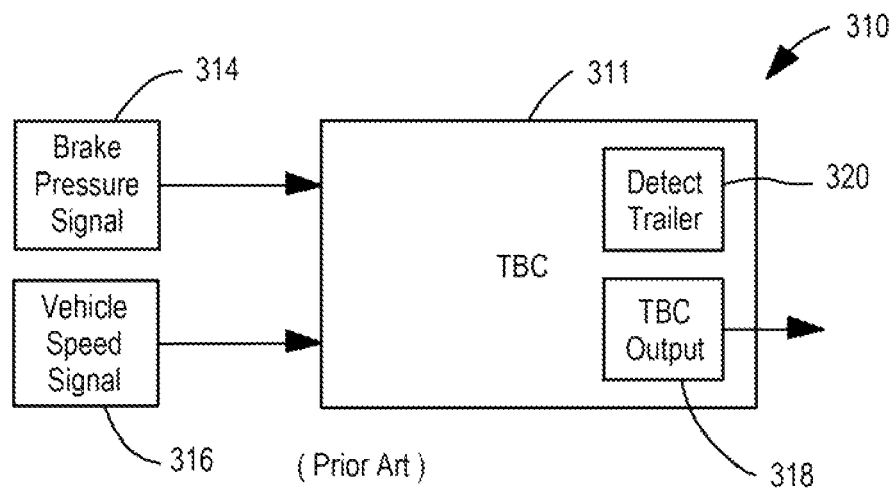
FIG. 13 is a block diagram of a prior art trailer brake controller system used in accordance with the inventive subject matter.

FIG. 13 is a block diagram of an integrated trailer brake controller (TBC) that may also supply information to the TMK monitoring system of the inventive subject matter. A TBC 310 in a passenger vehicle uses a vehicle speed input 316 and a vehicle brake pressure input 314 in a control element 311 to produce an output signal 318 that is sent to a trailer (not shown) in response to the inputs. The TBC may also be capable of detecting 320 when a trailer is attached to the vehicle and may supply a signal representative of the confirmation that a trailer is detected 320. The TBC 310 has the capability to communicate between the control element 311 and the message center 48. It should be noted that while a particular TBC system has been described herein, one skilled in the art is capable of implementing a different type of TBC system without departing from the scope of the present invention.

Upon detection of a trailer being attached to the vehicle, the TMK monitoring system will issue an appropriate warning signal to be displayed at the message center.

It should also be noted that while individual controllers 52, 150, 152, 222 and 311 have been described above as being associated with the TMK, ECU, body controller, TPMS controller and TBC, one skilled in the art is capable of understanding that any combination of controllers and control elements may be used to implement a TMK monitoring system of the inventive subject matter. For example, a centralized electronic control unit (ECU) or body control unit on the vehicle may be used to control the TPMS, power load monitor, the TBC and the TMK monitoring system of the inventive subject matter as well as many other vehicle systems too numerous to mention herein.

Figure 14:
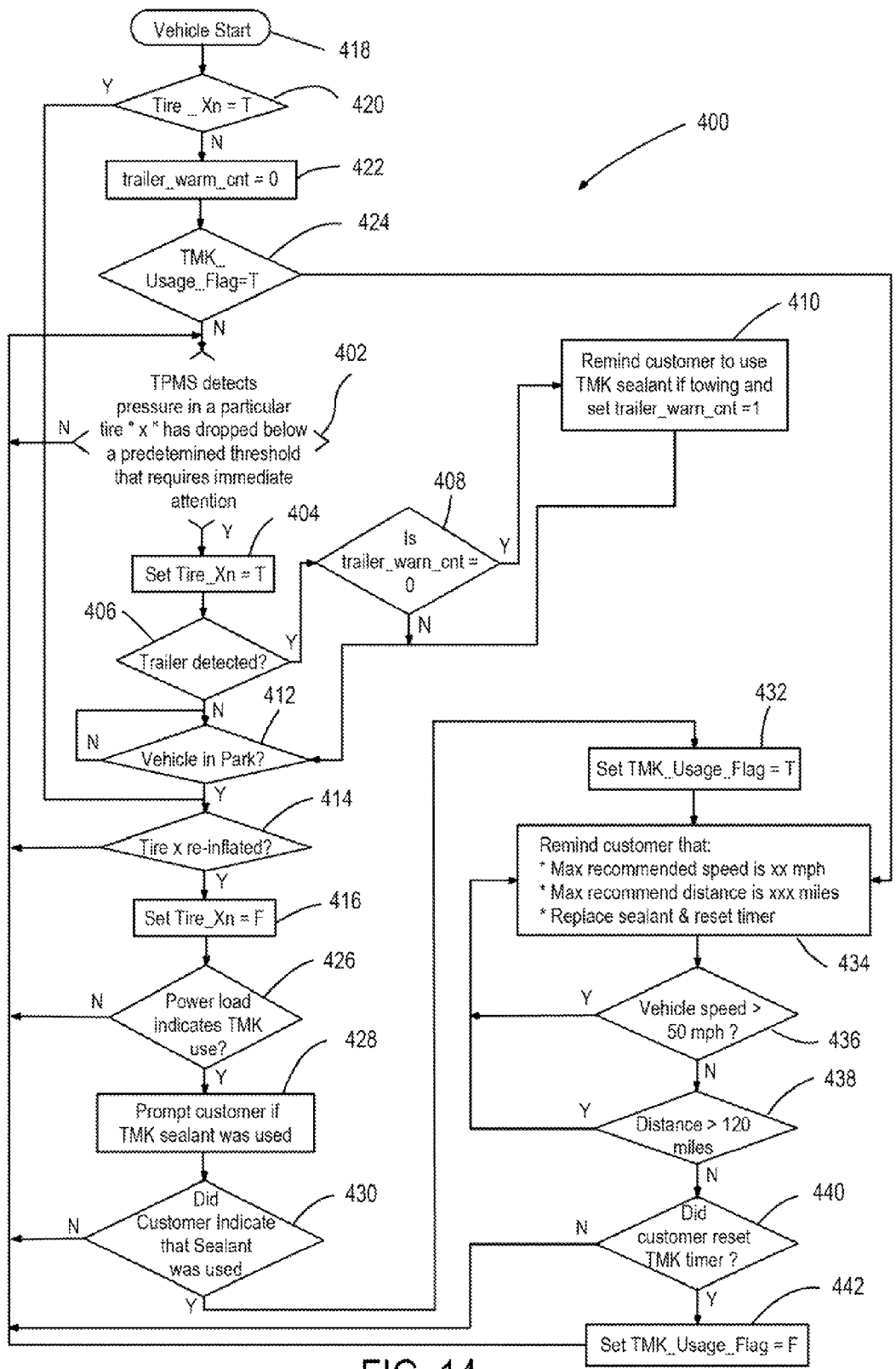
FIG. 14 is a data flow chart illustrating a method for operating the tire pressure monitoring system of the inventive subject matter.

FIG. 14 is a flow chart illustrating a method 400 for implementing the TMK monitoring system in accordance with one or more embodiments of the inventive subject matter. The method 400 may be carried out using information provided by any one or all of the TPMS, the TBC, and the power load monitor. One skilled in the art is capable of determining which controller 52, 152, 222, 311, combination thereof or a single centralized controller will execute signals and commands between the systems to implement the TMK monitoring system of the inventive subject matter described herein.

An operation is performed by the TPMS to detect 402 that a pressure in at least one tire is below a predetermined minimum threshold pressure. Upon detection of at least one low tire pressure, an operation is performed to set 404 a low tire pressure flag. An operation is performed by the TBC to detect 406 if a trailer is attached to the vehicle. In the event the TBC detects a trailer attached to the vehicle, an operation may be performed by the TBC to set 408 a trailer warning counter to a value of "0". Upon confirmation from the TPMS that at least one tire pressure is low and confirmation from the TBC that a trailer is attached to the vehicle, an indicator is issued 410 at the message center to remind the driver to use the TMK sealant when repairing the tire instead of using a spare tire. The trailer warning counter is also set to a value of "1".

The reminder indicator issued at step 410 remains at the message center as long as the vehicle is towing the trailer and the reminder to use the TMK for tire repair will continue until the TMK monitoring system detects 412 that the vehicle is parked. The TPMS will continue to monitor the tire pressure and will detect 414 when the tire is re-inflated. Only after detection by the TPMS that the tire has been re-inflated, is the low tire pressure flag is reset 416 so as to indicate that the tire pressure is no longer below the minimum tire threshold value.

The method 400 of the inventive subject matter is designed to contain multiple ignition key cycles, low pressure events, etc. So in the event the vehicle is parked and turned off, upon start up of the vehicle 418, the method will detect whether the low tire pressure flag remains "true" 420, and if not, then the trailer warning counter is set 422 to a value of "0" and a TMK usage flag is set 424. In the event the low tire pressure flag is set, the TPMS will continue to monitor the tire pressure 414, 402, 404, the TBC will check 406 for the trailer and the status indicator/reminder message will remain at the display 410 until the time the vehicle is parked and the tire is re-inflated.

Once the vehicle is parked, an operation is performed by the TPMS to detect 414 if the low tire pressure has been corrected. Upon detection that the low tire pressure has been corrected, the low tire pressure flag is reset 416 to indicate a "false" setting.

The method may then use information from the power load monitor. An operation is performed to determine 426 if a power load at a predetermined minimum value occurred for a predetermined minimum amount of time. If not, the method 400 continues to monitor tire pressure, trailer detection and vehicle movement. If the power load monitor confirms the power load, an operation is performed to present 428 a prompt at the message center requesting driver input relating to the status of the TMK sealant canister. In the event the driver responds 430 affirmatively to the prompt, a TMK usage flag is set 432.

When the TMK usage flag is set 424, 432, an operation is performed at the message center to remind 434 the driver that a maximum vehicle speed is should not be exceeded, that a maximum distance limit should not be exceeded, that the sealant canister is in need of replacement and/or service, and that a TMK timer needs to be reset.

One or more operations are performed to detect whether the vehicle exceeds a predetermined maximum velocity 436, whether the distance traveled exceeds a predetermined maximum distance 438 and whether the TMK system has been serviced 440. Once the TMK timer has been reset and the sealant canister has been serviced or replaced, the TMK usage flag is reset 442.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A status indicator and reminder system for use with a vehicle having a temporary mobility kit and a tire pressure monitoring system, the status indicator and reminder system comprising:
   a tire sealant containing temporary mobility kit fittable within the vehicle;
   an indicator; and
   a controller operatively coupled to the temporary mobility kit, the tire pressure monitoring system and the indicator, the controller generating a service warning signal for the temporary mobility kit in response to a signal from the tire pressure monitoring system and displaying the service warning signal at the indicator.

2. The system of claim 1, further comprising a feedback system generating a signal confirming the tire sealant has been used to re-inflate a tire.

3. The system of claim 2, wherein the feedback system further comprises an input from a driver at a message center coupled to the controller.

4. The system of claim 1, wherein the signal from the tire pressure monitoring system further comprises a signal indicating that at least one tire pressure has changed from being below a threshold pressure to being at least at the threshold pressure.

5. The system of claim 1, wherein the indicator comprises an audible or a visual indicator.

6. The system of claim 1, wherein the indicator comprises a visual indicator that includes messages pertaining to a maximum vehicle speed, a maximum distance limit, and a need to service the temporary mobility kit.

7. The system of claim 1, wherein the vehicle further comprises a power load monitor coupled to the controller and wherein occurrence of a predetermined minimum power load for a predetermined minimum amount of time sensed at the power load monitor triggers the controller to generate the service warning signal.

8. The system of claim 7, wherein the status indicator and reminder system further comprises a feedback system generating a signal confirming the tire sealant has been used to re-inflate a tire.

9. The system of claim 8, wherein the feedback system further comprises an input from a driver at a message center coupled to the controller.

10. The system of claim 1, wherein the status indicator and reminder system further comprises an input from a trailer brake controller indicating detection of a trailer attached to the vehicle.

11. The system of claim 10, wherein the indicator comprises a visual indicator that includes a reminder to use the temporary mobility kit when the vehicle has a trailer attached thereto.

12. The system of claim 11, wherein the visual indicator further comprises a warning to avoid using a spare tire when the vehicle has a trailer attached thereto.

13. A method of operating a monitoring system for a tire sealant containing temporary mobility kit of a vehicle having a tire pressure monitoring system, the method comprising:
   programming a controller, which is operatively coupled to the temporary mobility kit and to the tire pressure monitoring system, to generate a temporary mobility kit service signal in the controller based on information supplied by the tire pressure monitoring system; and
   programming the controller to display the service signal at a message center.

14. The method as claimed in claim 13, wherein the information supplied by the tire pressure monitoring system comprises a signal from the tire pressure monitoring system indicating at least one tire pressure has returned at least to a minimum threshold pressure after being below the minimum threshold pressure.

15. The method as claimed in claim 14, further comprising programming the controller to request an input at the message center confirming the tire sealant was used.

16. The method as claimed in claim 13, wherein programming the controller to display the service signal comprises displaying a service signal warning for one or more of a maximum vehicle speed, a maximum distance limit, and a need to service the temporary mobility kit.

17. The method as claimed in claim 13, wherein the vehicle comprises a power load monitor and the method further comprises programming the controller to generate the service signal based on an occurrence of a minimum load at a voltage outlet on the vehicle for a predetermined minimum amount of time as detected by the power load monitor.

18. The method of claim 13, wherein the vehicle comprises a trailer brake controller system operatively coupled to the controller to supply information to the controller indicating that a trailer is attached to the vehicle.

19. The method of claim 18, wherein programming the controller to display the service signal further comprises displaying a service signal comprising a reminder to use the temporary mobility kit when the vehicle has a trailer attached thereto.

20. The method of claim 19, wherein programming the controller to display the service signal further comprises displaying a service signal further comprising a warning to avoid using a spare tire.

21. A method of operating a monitoring system for a tire sealant containing temporary mobility kit of a vehicle having a tire pressure monitoring system, a power load monitor and a trailer brake controller system, the method comprising:
   programming a controller to generate a temporary mobility kit service signal based on a signal from the tire pressure monitoring system indicating at least one tire pressure has returned to at least a minimum threshold pressure after being below the minimum threshold pressure;
   programming the controller to generate a temporary mobility kit service signal based on an occurrence of a minimum load at a voltage outlet on the vehicle for a predetermined minimum amount of time as detected by the power load monitor;
   programming the controller to generate a temporary mobility kit service signal based on a signal from the trailer brake controller system that detects a trailer attached to the vehicle; and
   programming the controller to display the service signal at a message center.

22. The method as claim in claim 21, further comprising programming the controller to request confirmation at the message center that the tire sealant was used.

23. The method as claim in claim 21, wherein programming the controller to display the service signal further comprises displaying a service signal warning for a driver not to exceed a predetermined maximum speed.

24. The method as claim in claim 21, wherein the step of programming the controller to display the service signal further comprises displaying a service signal warning a driver not to exceed a predetermined maximum distance.

25. The method as claim in claim 21, wherein the step of programming the controller to display the service signal further comprises displaying a service signal warning a driver to service the temporary mobility kit.

26. The method as claim in claim 21, wherein the step of programming the controller to display the service signal further comprises displaying a service signal warning the driver to use the temporary mobility kit when a trailer is attached to the vehicle.

27. The method as claim in claim 26, wherein the step of programming the controller to display the service signal further comprises displaying a service signal warning the driver to avoid using a spare tire.

* * * * *